United States Patent [19]

Yu

[11] Patent Number: 6,078,943
[45] Date of Patent: Jun. 20, 2000

[54] METHOD AND APPARATUS FOR DYNAMIC INTERVAL-BASED LOAD BALANCING

[75] Inventor: Philip Shi-Lung Yu, Chappaqua, N.Y.

[73] Assignee: International Business Machines Corporation, Armonk, N.Y.

[21] Appl. No.: 08/798,385

[22] Filed: Feb. 7, 1997

[51] Int. Cl.[7] .................................................. G06F 9/00
[52] U.S. Cl. .................................. 709/105; 709/102
[58] Field of Search .................................. 709/102, 103, 709/105, 100

[56] References Cited

U.S. PATENT DOCUMENTS

| | | | |
|---|---|---|---|
| 5,287,508 | 2/1994 | Hejna, Jr. et al. | 709/102 |
| 5,371,852 | 12/1994 | Attanasio et al. | 709/245 |
| 5,774,668 | 6/1998 | Choquier et al. | 709/223 |
| 5,815,664 | 9/1998 | Asano | 709/227 |

FOREIGN PATENT DOCUMENTS

WO9729424  8/1997  WIPO .............................. G06F 9/46

OTHER PUBLICATIONS

Brisco, T., "DNS Support for Load Balancing", RFC 1974, Rutgers University, Apr. 1995.
Dias, D. M. et al., "A Scalable and Highly Available Web Server", Proc. 41st IEEE Computer Society Intl. Conf. (COMPCON) 1996, Technologies for the Information Superhighway, pp. 85–92, Feb. 1996.
Katz, E. et al. "A Scalable HTTP Server: The NCSA Prototype", Computer Networks and ISDN Systems, vol. 27, 1994, pp. 68–74.
Colajanni, M. et al. "Scheduling Algorithms for Distributed Web Servers", IBM Research Report, RC 20680, Jan. 1997.

*Primary Examiner*—Majid A. Banankhah
*Attorney, Agent, or Firm*—Kevin M. Jordan

[57] ABSTRACT

A method for use in geographically distributed or clustered system wherein an arbiter assigns clients to servers. The arbiter also dynamically assigns a valid time interval to each mapping request based on network load and/or capacity parameters such as the client request rate and/or the server capacity. Alternative means for dynamically setting the valid interval in conjunction with a scheduling process, which can be either deterministic or probabilistic, are also devised.

20 Claims, 9 Drawing Sheets

FIG. 12

METHOD AND APPARATUS FOR DYNAMIC INTERVAL-BASED LOAD BALANCING

FIELD OF THE INVENTION

The present invention relates generally to providing load balancing across distributed sites which may include heterogeneous servers with different capacities. A more particular aspect of the present invention relates to a method and system for use in distributed or clustered systems, wherein an arbiter assigns sets of clients to servers with a dynamically adjusted valid interval for the assignment.

BACKGROUND

The traffic on the World Wide Web is increasing exponentially, especially at popular (hot) sites. In addition to growing the capacity of hot sites by clustering nodes at that site, additional nodes geographically distributed sites are often added. Adding geographically distributed sites can provide for both added capacity and disaster recovery.

The nodes are replicated and made to appear as one entity to clients, so that the added capacity provided by the set of sites is transparent to clients. These replicated sites often include heterogeneous servers with different capacities. An arbiter can be provided that assigns clients to sites.

In order to support a load that increases close to linearly with total capacity of the set of sites, it is important that the client load be balanced among the sites. Thus, there is a need for methods for balancing the load among the sites.

Previous work on load balancing in a multi processor or multiple node environment, such as the IBM S/390 Sysplex, primarily focuses on scheduling algorithms which select one of multiple generic resources for each incoming task or user session. The scheduler controls the scheduling of every incoming task or session and there is no caching of the resource selection.

One method in the art for balancing the load among geographically distributed replicated sites, is known as the Round-Robin Domain Name Server (RR-DNS) approach. The basic domain name server method is described in the paper by Mockapetris, P., entitled "Domain Names—Implementation and Specification," RFC 1035, USC Information Sciences Institute, November 1987. Load balancing support using DNS is also described in the paper by Brisco, T., "DNS Support for Load Balancing," RFC 1794, Rutgers University, April 1995. In the paper by Katz., E., Butler, M., and McGrath, R., entitled "A Scalable HTTP Server: The NCSA Prototype", Computer Networks and ISDN Systems, Vol. 27, 1994, pp. 68–74, the RR-DNS method is used to balance the node across a set of web server nodes. Here, the set of distributed sites is represented by one URL (e.g., www.hotsite.com); a cluster sub-domain for this distributed site is defined with its sub-domain name server. The sub-domain name server maps client name resolution requests to different IP addresses in the distributed cluster. Thus, subsets of the clients will be assigned to each of the replicated sites.

In order to reduce network traffic, a mapping request is not issued for each service request. Instead, the result of the mapping request is saved for a "time-to-live" (TTL) interval. Subsequent requests issued during the TTL interval will follow the result of the previous mapping and hence be routed to the same server node.

A problem with the RR-DNS method is that poor load balance among the distributed sites may result, as described in the paper, Dias, D. M., Kish, W., Mukheijee, R., and Tewari, R., "A Scalable and Highly Available Web Server", Proc. 41st IEEE Computer Society Intl. Conf. (COMPCON) 1996, Technologies for the Information Superhighway, pp. 85–92, February 1996. The problem is caused by caching of the association between name and IP address at various gateways, fire-walls, and domain name-servers in the network. Thus, for the TTL period all new client requests routed through these gateways, fire-walls, and domain name-servers will be assigned to the single site stored in the cache. Those skilled in the art will realize that a simple reduction in the TTL value will not solve the problem. In fact, low TTL values are frequently not accepted by many name servers. More importantly, a simple reduction of TTL value may not reduce a load skew caused by unevenly distributed client request rates.

One method of load balancing within a local cluster of nodes is to use a so-called TCP router as described in: "A Virtual Multi-Processor Implemented by an Encapsulated Cluster of Loosely Coupled Computers," by Attanasio, Clement R. and Smith, Stephen E., IBM Research Report RC 18442, 1992; and U.S. Pat. No. 5,371,852, entitled "Method and Apparatus for Making a Cluster of Computers Appear as a Single Host", issued Dec. 6, 1994 which is hereby incorporated by reference in its entirety. Here, only the address of the TCP router is given out to clients; the TCP router distributes incoming requests among the nodes in the cluster, either in a round-robin manner, or based on the load on the nodes. The TCP router method as described in these papers only applies to a local cluster of nodes.

More recently, in the paper by Colajanni, M., Yu, P., and Dias, D., "Scheduling Algorithms for Distributed Web Servers," IBM Research Report, RC 20680, January 1997, which is hereby incorporated by reference in its entirety, a multi-tier round robin method is proposed to divide the gateways into multiple tiers based on their request rates. Requests from each tier are scheduled separately using a round robin algorithm. This method can also handle a homogeneous distributed server architecture.

In either case, the aforementioned load imbalance which can result from the caching of the association between name and IP address at various gateways, fire-walls, and DNSs in the network remains since the number of data requests following an address request, independent of its origin, is proportional to the TTL value. Thus there is a need for improved methods of load balancing among distributed or clustered sites which may include heterogeneous servers. The present invention addresses such a need.

SUMMARY

In accordance with the aforementioned needs, the present invention is directed to an improved method and apparatus for load balancing client requests among distributed or clustered replicated sites, which may include heterogeneous capacity servers.

More particularly, the present invention is directed to an environment such that a scheduler (also called an "arbitrator") receiving an address mapping request returns not only the address of the chosen server but also a valid time interval whereby subsequent requests occurring during the interval will be routed to the chosen server. The present invention has features which transform the valid time interval parameter into a dynamic control to better balance the load.

An example of an apparatus having features of the present invention decomposes a scheduler into two major components: one is scheduling logic for selecting the next available server; and the second is a valid interval logic for dynamically computing the valid time interval. The scheduling component can use any standard routing method such as round-robin. The valid time interval logic of the present invention dynamically controls the valid time interval of the server selection or routing decision and is described below.

Another aspect of the present invention provides a method for load balancing that applies to general distributed environments in addition to that for the World Wide Web.

A method having features of the present invention can be embodied in a distributed or clustered network of servers wherein clients are divided into groups which periodically send mapping requests to an arbitrator for mapping and balancing service requests among multiple replicated servers which can service the request. An example of a computerized method according to the present invention for mapping servers to service requests includes the steps of: mapping a first mapping request from a first group to a first server according to a scheduling process; dynamically computing a valid interval for said mapping request to the first server as a function of one of a first group request load and a first server capacity; and communicating the server selection and the valid interval to the first group for caching such that subsequent requests from the first group are routed to the first server during the valid interval.

In a preferred embodiment, the present invention can be applied to the World-wide Web (WWW). Here, each of the servers are web servers at geographically distributed sites, the arbitrator is an extended domain name server and each address mapping includes a time-to-live (TTL) interval, and wherein the group consists of a set of clients associated with either a common gateway (or SOCKS server). The above mapping step can be modified to include mapping a name request to an IP address; and the step of dynamically computing a valid interval includes dynamically computing the TTL as a function of one of a gateway request load and a capacity of a destination server associated with the IP address.

Thus, by dynamically selecting the TTL value for each address request, the present invention can reduce the load skews that are the main cause of overloading, especially in a heterogeneous system.

The dynamic TTL logic of the present invention advantageously balances the impact of subsequent requests on each server during the TTL interval. More specifically, the effect is to make subsequent requests from each gateway consume similar amounts of server utilization or percentages of server capacity. This can address both server heterogeneity and non-uniform client rates. First consider server heterogeneity. A higher TTL value is assigned when the DNS chooses a more powerful server, and a lower TTL value is used when the requests are routed to a less capable server. This is due to the fact that for the same fraction of server capacity, the more powerful server can handle a larger number of requests, or take requests for a longer TTL interval.

An analogous approach can be adopted to handle the non-uniform distribution of client request rates. The address mapping requests coming from hot gateways can be given a lower TTL value than requests originated by other gateways. As the hot gateways have higher client request rates, a shorter TTL interval can be used to even out the total number of subsequent requests generated.

According to yet another aspect of the present invention, the dynamic TTL logic can be combined with a basic round-robin (RR) algorithm and variants such as a multi-tier round robin, or any other load balancing algorithms such as shortest queue first.

In the preferred embodiment, RR is assumed to be the scheduling algorithm. According to still further aspects of the present invention, both deterministic and probabilistic routing methods based on RR are provided. Both methods handle non-uniform requests by using TTL values inversely proportional to the data request rate of the source gateway. However, the deterministic strategies handle server heterogeneity by making TTL values proportional to the server capacities, while the probabilistic policies use the probabilistic versions of RR.

BRIEF DESCRIPTION OF THE DRAWINGS

These, and further, objects, advantages, and features of the invention will be more apparent from the following detailed description of a preferred embodiment and the appended drawings wherein.

DETAILED DESCRIPTION

Figure 1:
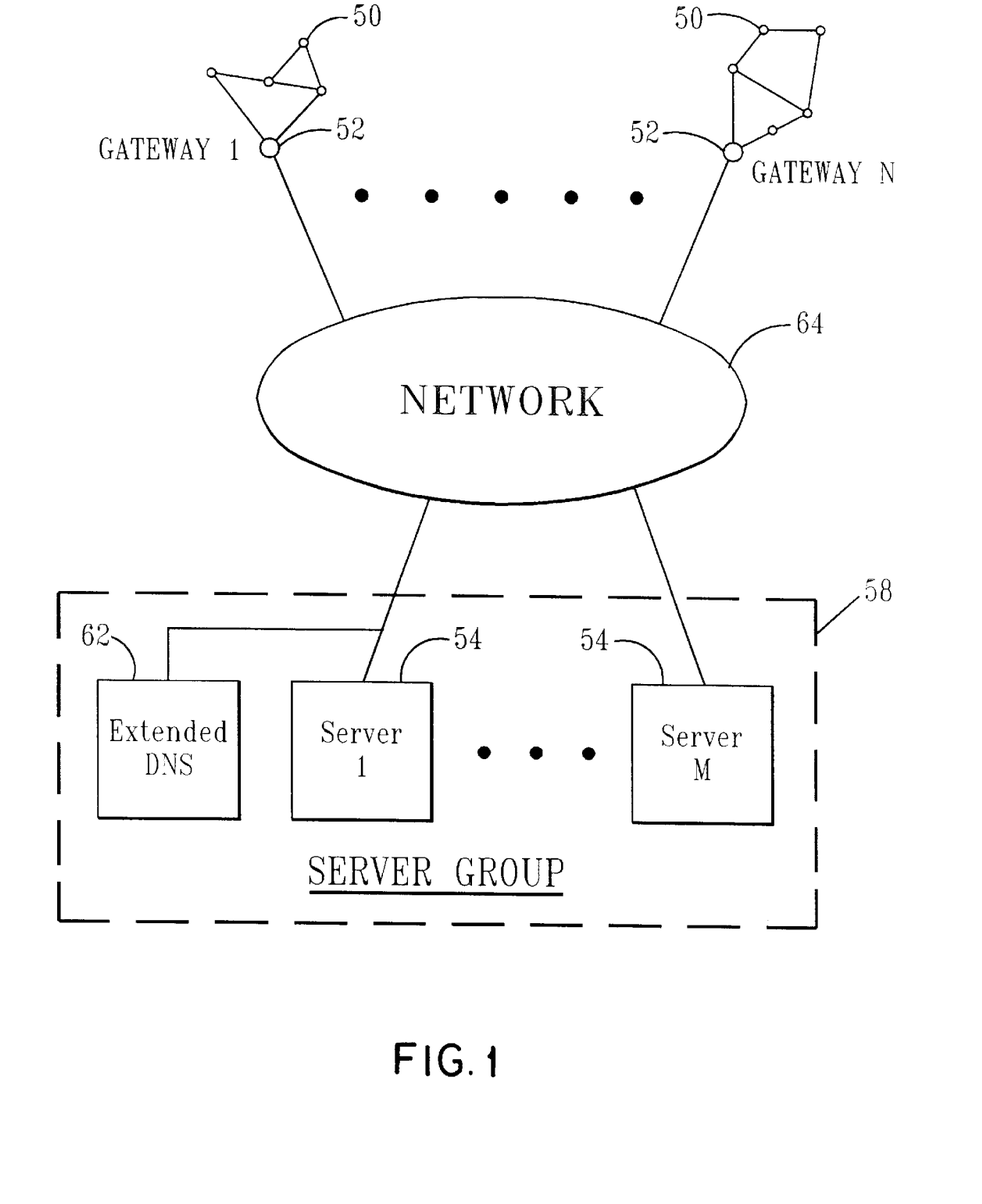
FIG. 1 is a diagram of an Internet environment having features of the present invention.

FIG. 1 depicts an example of an Internet environment having features of the present invention. Client workstations or PCs (50) are connected through a common gateway (52) to the network (64). They request services from the servers (54) which are also connected to the network (64). Typical service requests include World-Wide-Web page accesses, remote file transfers, electronic mail, transaction support, etc.

For certain services, more than one server may be required, forming a service group (58), to handle the high traffic requirement. These servers may be located at geographically distinct locations. Nevertheless the existence of the multiple servers are transparent to the clients. Clients issue service requests based on a logical or symbolic name of the server group. This can be provided by a domain name server, DNS, to map the logical or symbolic name into the physical or IP address of one of the server nodes in the server group. This is done through a mapping request from the clients to the DNS. The mapping requests are thus different from the service requests, which are issued from the clients to the servers.

In order to reduce network traffic, mapping requests are not issued for each service request. Instead, the result of the mapping request is saved for the TTL period. Subsequent service requests issued during the TTL period will follow the result of the previous mapping and hence be routed to the same server node.

According to the present invention, the standard DNS is improved to better balance the client service requests among servers in the server group; this generalization is referred to as an "Extended DNS" (62). The extended DNS (XDNS) is also called an "arbitrator" in a more generic architecture which will be detailed below. Referring again to FIG. 1, each of the servers (54) are web servers at a distributed or clustered sites (190), and each address mapping includes a time-to-live (TTL) interval. Each set of clients 50 is associated with either a common gateway (52) (or SOCKS server). The XDNS maps a name request to an IP address and dynamically computes a TTL as a function of the gateway request load and/or capacity of the destination server associated with the IP address.

Figure 2:
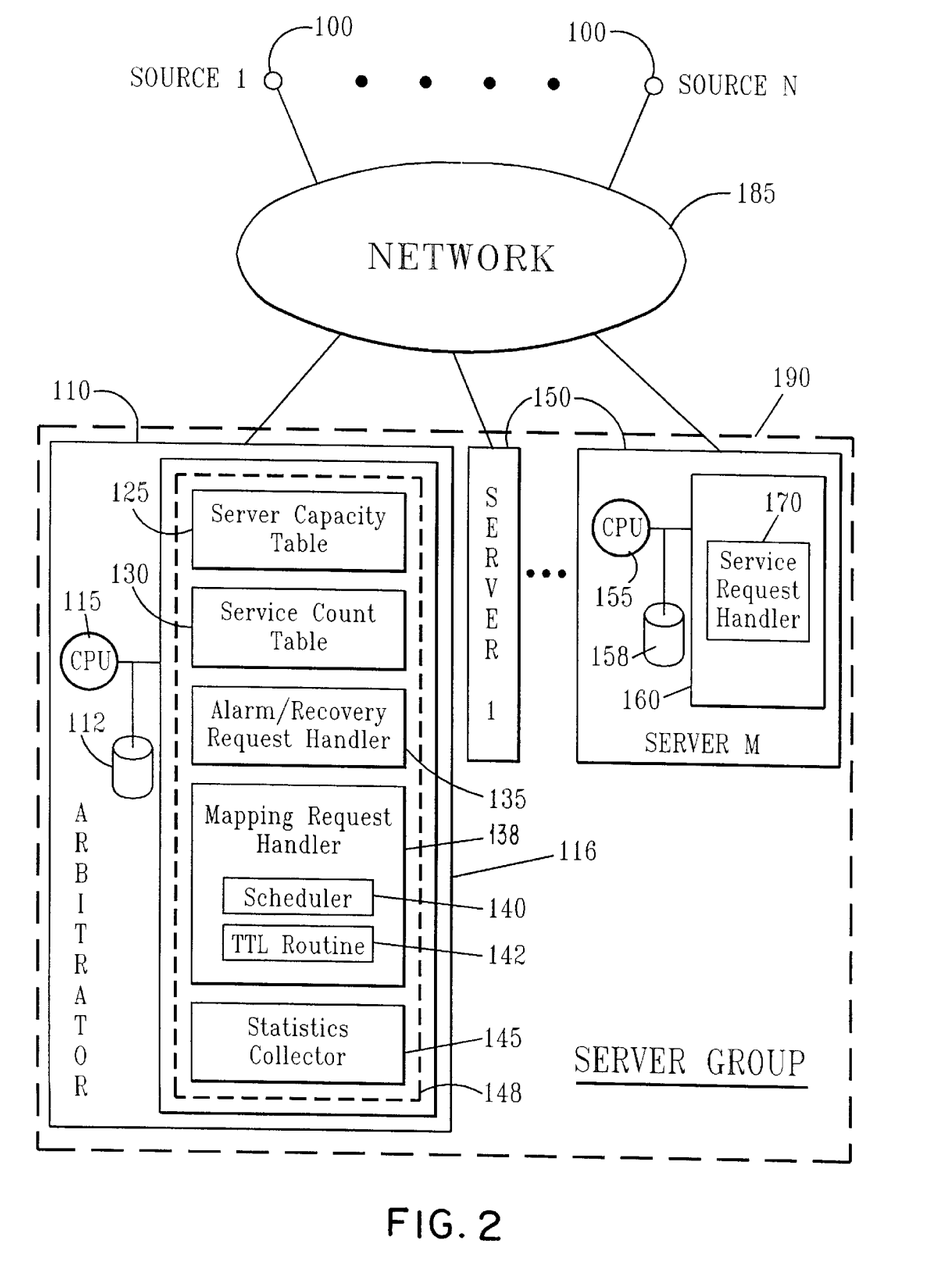
FIG. 2 is a more detailed example of a general environment having features of the present invention.

FIG. 2 depicts a more detailed example of a network (185) and system having features of the present invention. As depicted, a source (100) is used to represent any computing node that can issue mapping and service requests through the network (185). An arbitrator (110) represents any computing node that can schedule a mapping request to one of the server nodes (150). FIG. 1, based on the Internet, is a special case of FIG. 2, wherein the arbitrator (140) corresponds to the Extended DNS (62). The arbitrator preferably includes a CPU (115), memory (116) such as RAM, and storage devices (112) such as DASD.

The memory (166) stores arbitrator logic (148) preferably embodied as computer executable code which is loaded from DASD (112) into memory (116) for execution by CPU (115). The arbitrator logic (148) is divided for clarity and by way of example only, into several components: an alarm/recovery handler (135), a mapping request handler (138), and a statistic collector (145). These components are explained in details in FIGS. 4, 5 and 8, respectively. The mapping request handler consists of two major components: the scheduler logic (140) and the TTL logic (142). Several data structures are maintained, including a service (request) count table (130), and a server capacity table (125). The operations on these data structures will be explained with the various components.

Servers 1 . . . M (150) can be any computing node that can handle service requests such as providing data/object accesses and/or file transfers requested by the sources (100). The server nodes (150) include CPU (155), memory (160) and storage devices (158). The server node executes a service request handler (170) to process the service requests as detailed in FIG. 9.

Denote N as the number of sources and M as the number of servers 150 . . . 150M. Let GW(I,j) be the number of service requests from source 100I to server 150j in an interval of given length, t. Then let A(I) be the service requests rate from source 100I and C(j) be the relative capacity of server 150j. In the preferred embodiment, it is assumed that A(I) changes dynamically. An example of a method for estimating A(I) periodically will be described in FIG. 8, whereas C(j) is relatively stable and may be determined at initialization time (as will be described in FIG. 3). A(I), 1<I<N+1, and 1<j<M+1, represent the service count table (130) and server capacity table (125) in FIG. 2, respectively.

Figure 3:
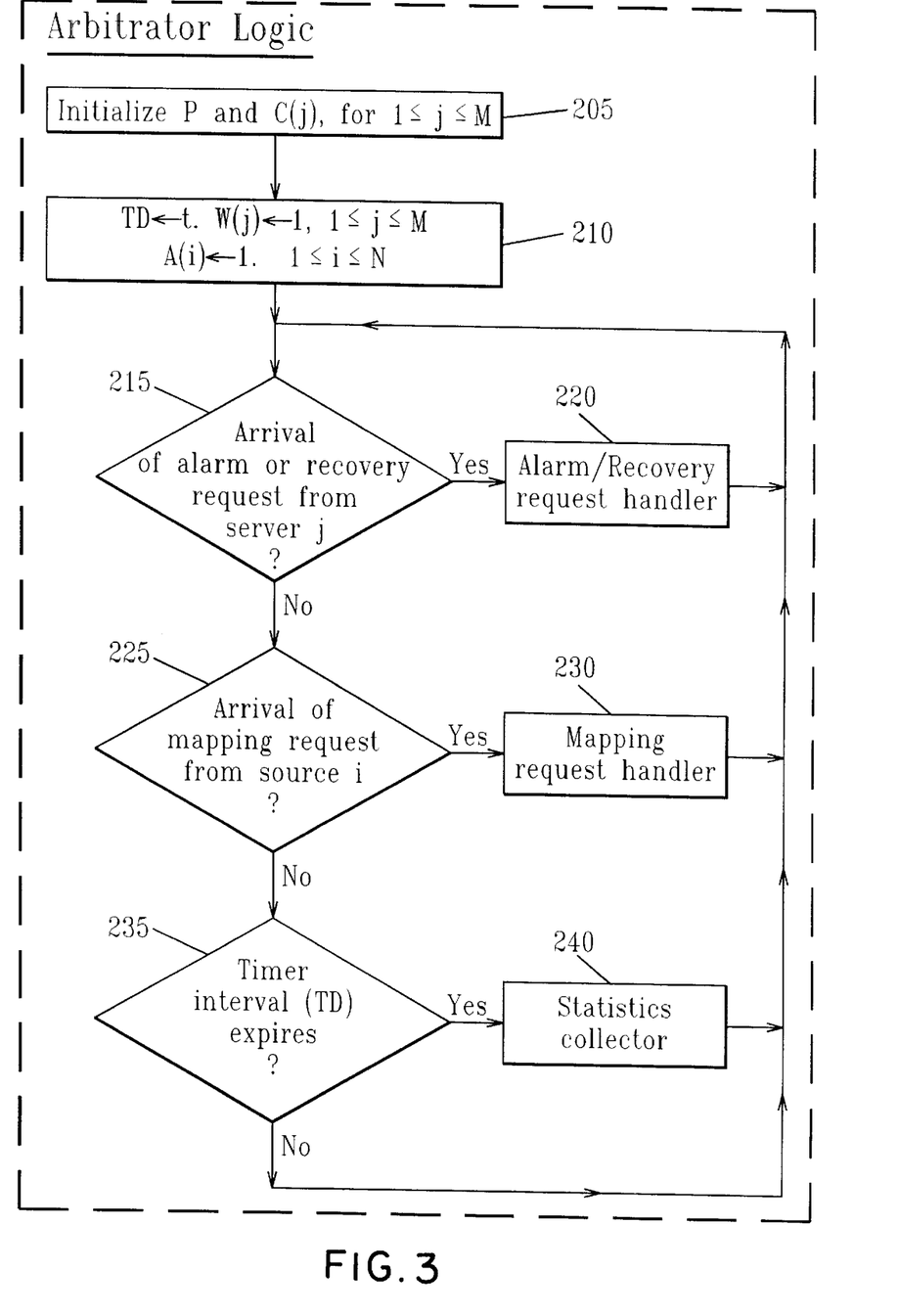
FIG. 3 is an example of the arbitrator logic of FIG. 2.

FIG. 3 depicts an example of the arbitrator logic (148). As depicted, in step 205 the starting destination server P is initialized. Also the relative server capacity, C(j), is initialized according to the number of requests it can handle normalized by the maximum capacity among the servers. In step 210, the timer interval (TD) to collect statistics is set to t, say 5 minutes. The array W(j), 0<j<M+1, and the array A(I), 0<I<N+1, are set to 1.

The arbitrator logic (148) then repeatedly checks for the input. In step 215, upon detection of the arrival of an alarm/recovery request from a server, say server j, the alarm/recovery request handler is invoked, in step 220 (a detailed example of step 220 is given in FIG. 4). In step 225, if a mapping request from a source I (0<I<N+1) is detected, the mapping request handler is invoked, in step 230 (a detailed example of step 230 is given in FIG. 5). In step 235, if the expiration of the statistic collection timer interval (TD) is detected, the arbitrator executes the statistic collector routine in step 240 (a detailed example of step 240 is given in FIG. 8).

Figure 4:
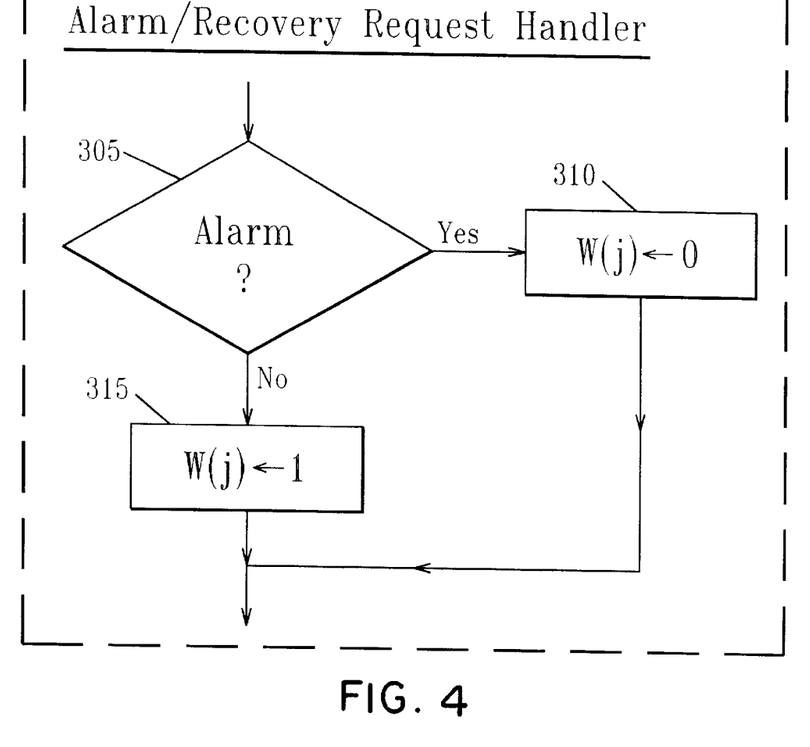
FIG. 4 is an example of the alarm/recovery request handler of the arbitrator.

FIG. 4 depicts an example of the alarm/recovery request handler (135). In step 305, the request type is checked to determine whether it is an alarm request. If it is found to be an alarm request, in step 310, W(j) is set to zero to indicate that server j is in overloading state. Otherwise, a recovery request is received, in step 315 W(j) is set to 1.

Figure 5:
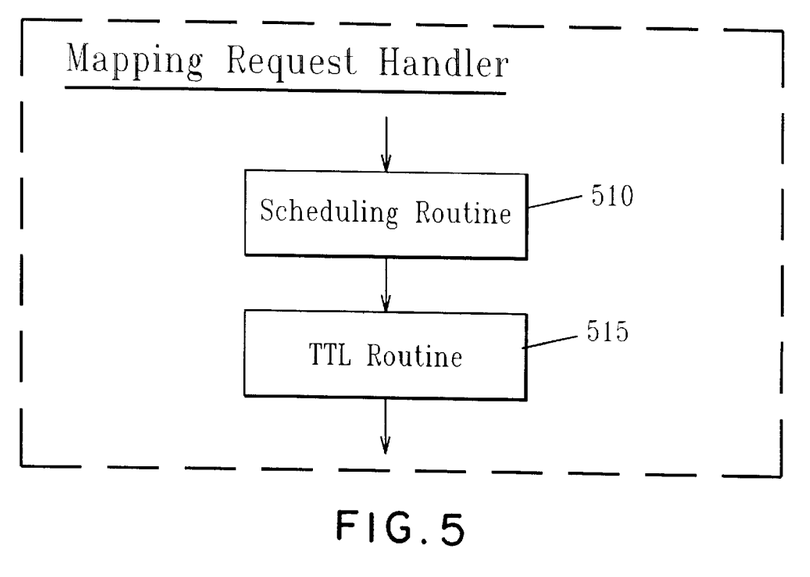
FIG. 5 is a an example of the mapping request handler of the arbitrator.

FIG. 5 depicts an example of the mapping request handler (138). In step 510, the scheduling routine is invoked to determine the server selection. In step 515, the TTL routine is invoked to determine the TTL interval. Examples of the scheduling logic (140) and TTL logic (142) are detailed in FIGS. 6 and 7 using a deterministic approach.

Deterministic Algorithms

By way of overview, first consider the effect of heterogeneous servers. Here, a TTL value is dynamically computed as a function of the capacity of the server that has been chosen by the DNS. The objective is to reduce the number of data requests for less powerful servers and increase them for the servers with higher capacities.

Next consider non-uniform request rates from the gateways. The approach can be the same as described for a probabilistic case (described later). However, the TTL value is now chosen by considering the server capacity as well. The deterministic TTL/1 algorithm is a degenerate case that considers server heterogeneity only and ignores the source gateway of the client requests, i.e., each server is given its own TTL value based on its capacity. The TTL/2 policy adopts two TTL values for each server. The TTL value selected for each server depends on the source gateway of the requests, i.e., normal or hot gateway.

The TTL/K algorithm selects a TTL value for each type of server and gateway combination. Specifically, let TTL(ij) be the TTL for the j-th gateway to the I-th server, $$TTL(i,j) = h \; C(I)/A(j)$$

where h is a parameter which scales the overall rate of address mapping requests.

For TTL/I, the gateways are partitioned into I groups, and the client request rate for each group is estimated. The TTL for each group at server I is set in inverse proportion to its request rate and in direct proportion to the server capacity.

Figure 6:
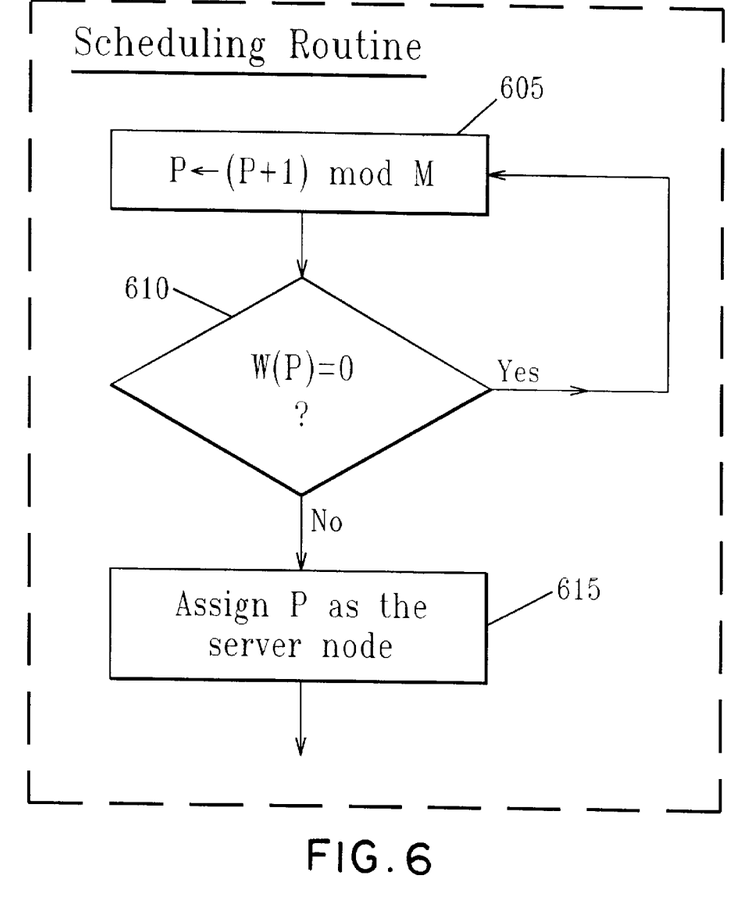
FIG. 6 is an example of the scheduler logic used by the mapping request handler.

FIG. 6 depicts an example of the scheduler logic (140). In step 605, P is incremented and modulo by the number of server (M). In step 610, the state of the server is tested for overloading. If W(P) is not equal to zero, server P is selected and the requesting source is notified of the selection, in step 615. Otherwise, step 605 is repeated to generate another candidate server.

Figure 7:
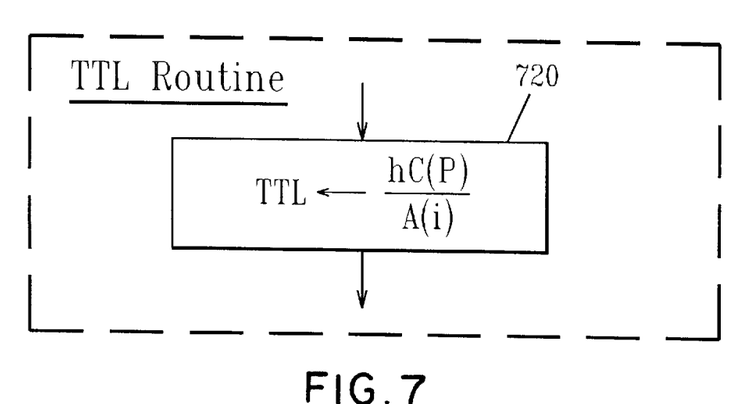
FIG. 7 is an example of the TTL logic of the arbitrator.

FIG. 7 depicts a deterministic example of the TTL interval calculation. As depicted, in step 720, the TTL is a function of C(P), the capacity of the server P selected and A(I), the service request rate of the source I.

Figure 8:
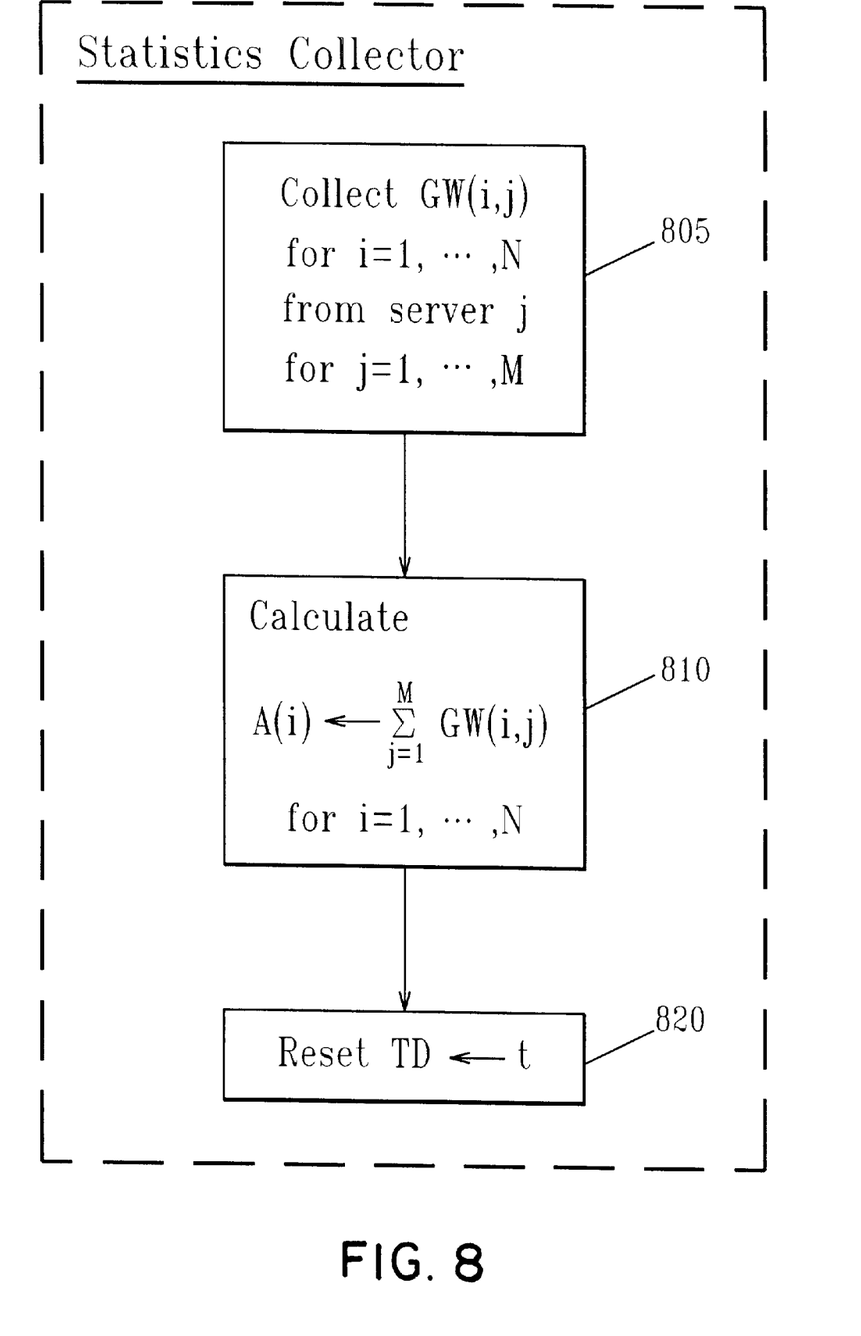
FIG. 8 is an example of the statistics collector logic of the arbitrator.

FIG. 8 depicts an example of the statistics handler. In step 805, the arbitrator collects the GW(I,j), 0<I<I+1, from each server. This can be done by explicitly sending a message for the requested information. After collecting the information from all servers, in step 810 A(I), the average service request rate from source I, is calculated. In step 820, the timer interval is reset to t.

Figure 9:
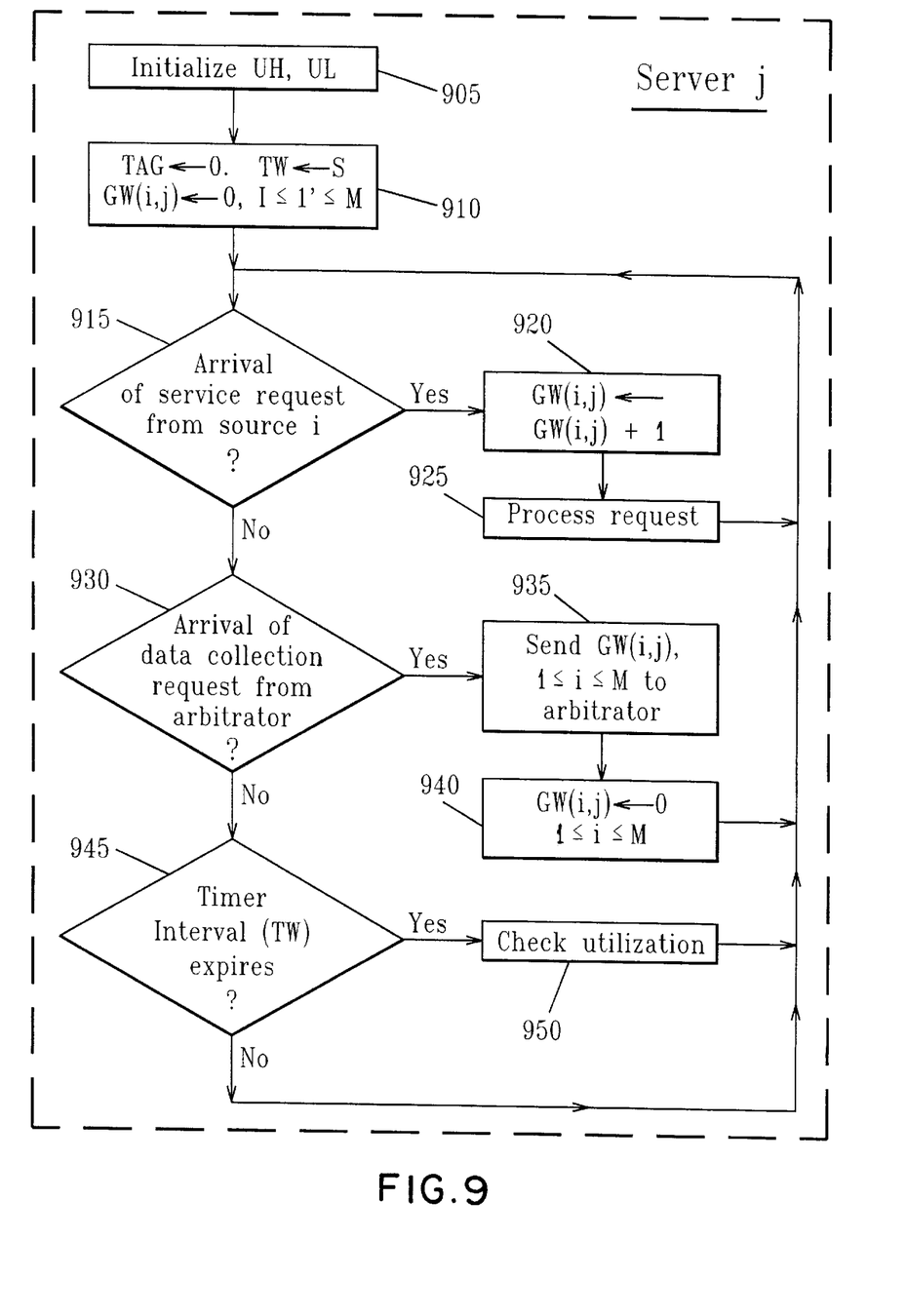
FIG. 9 is an example of the service request handler of FIG. 2.

FIG. 9 depicts an example of a server (150), say server j, having features of the present invention. In step 905, the two utilization levels, UH and UL, representing overloading and returning to normal, are initialized. For example, one can choose UH to be 90 percent utilization and UL to be 70 percent utilization. In step 910, array GW(I,j), for 0,I<M+1, is initialized to zero. Also the timer interval (TW) for checking utilization is initialized to s, say 1 minute, and a state variable (TAG) is set to zero. Note that TAG is set to zero when the server is detected to be overloading.

Server j then repeatedly checks for the input. In step 915, upon detection of the arrival of a service request from source I, GW(I,j) is incremented in step 920 and the service request is processed, in step 925. In step 930, if a data collection request from the arbitrator (110) is detected, server j sends GW(I,j) for 0<I<M+1, to the arbitrator in step 935 and sets GW(I,j), for 0<I<M+1, to zero in step 940. In step 945, if the expiration of the timer interval (TW) for is detected, the server executes a check utilization routine, in step 950. A detailed example of step 950 is given in FIG. 10.

Figure 10:
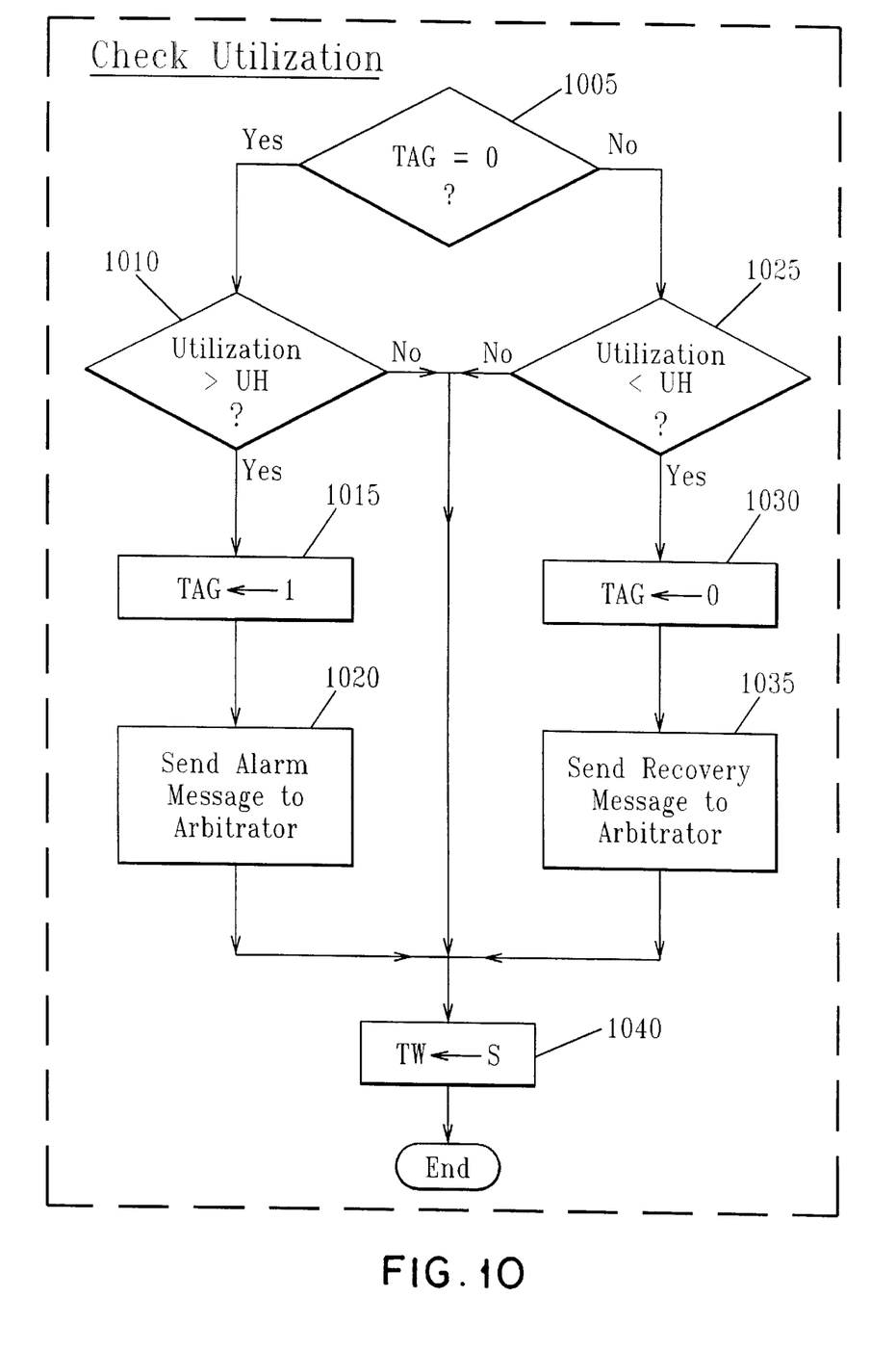
FIG. 10 is an example of the check utilization routine used by the server.

FIG. 10 depicts an example of the check utilization routine. As depicted, in step 1005, the state of the server, TAG. is checked. If the value of TAG is equal to zero, in step 1010 the server utilization is checked. If the utilization is higher than UH, in step 1015, TAG is set to one and in step 1020, an alarm message is sent to the arbitrator (110). In step 1040, the timer interval is reset to s. In step 1010, if the utilization is less than UH, step 1040 is executed. In step, 1005, if the value of TAG does not equal to zero, in step 1025; the utilization of the server is checked. If the utilization is lower than UL, in step 1030, TAG is set to zero and in step 1035, a recovery (to normal) message is sent to the arbitrator.

Figure 11:
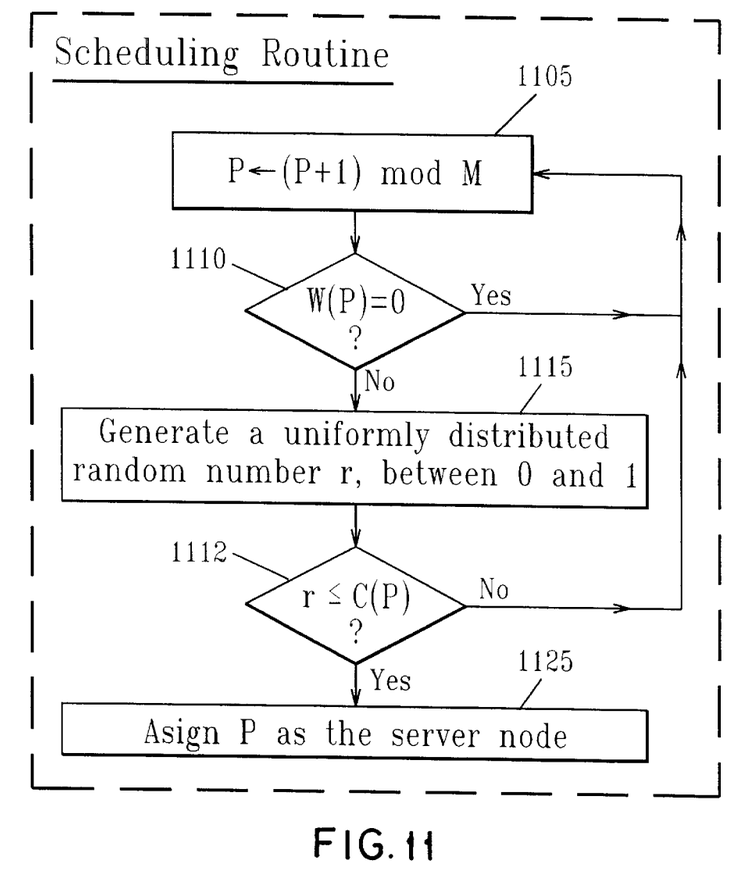
FIG. 11 is a an example of the scheduler logic for a probabilistic routing case.
Figure 12:
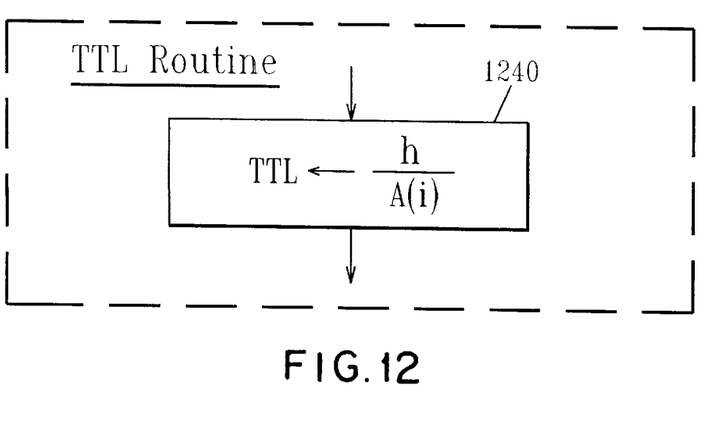
FIG. 12 is an example of the TTL logic for the probabilistic routing case.

Those skilled in the art will readily appreciate that various extensions to the present invention can be used within the spirit and scope thereof. For example, although the scheduler and TTL logic elaborated in FIGS. 6 and 7 is exemplified using a deterministic approach, they can be easily modified for the probabilistic case. FIGS. 11 and 12 give alternative scheduler logic and TTL logic, respectively.

Probabilistic Algorithms

By way of overview, first consider the effect of heterogeneous servers. Algorithms such as RR seek to balance a request load among distributed homogeneous servers. These policies can be extended to a heterogeneous Web system through the addition of probabilistic routing features based upon the server capacity.

Assume that C(I) is the relative capacity of server I, i.e. the capacity of server I divided by the maximum capacity among them. The DNS scheduler generates a random number r (0<r<1) and, under the assumption that the (I−1)th server was the last chosen server, the new request is assigned to the I-th server, only if r is less than C(I). Otherwise, the scheduler skips the I-th server and considers the (I+1)-the server repeating the same process. This modification allows RR or its variant to schedule the requests while accounting for varying server capacities.

Next consider non-uniform request rates from the gateways. This method, in its most generic form (TTL/1),
assumes that the request rate of each gateway can be dynamically estimated. This can be done by having each server keep track of the number of incoming requests from each gateway and the DNS periodically collect the information and calculate the client request rate from each gateway. TTL/I is a meta-algorithm that may include various strategies. For I=1, it represents a degenerate policy (TTL/1) that use a single TTL for each requests, hence not an adaptive TTL algorithm; for I=2, the policy (TTL/2) partitions the gateways into two classes: normal gateways, and hot gateways. It chooses a high TTL for requests coming from hot gateways, and a low TTL for requests coming from normal gateways. Analogously, for I=3, it is a strategy that is based on a three-tier partition of the gateways, and so on, until I=K, or (TTL/K) wherein a different TTL is used for each gateway. For TTL/K, let TTL(j) be the TTL value for the j-th gateway, $$TTL(j) = h/A(j)$$

where A(j) is the data request rate of the j-th gateway and h is some constant parameter which scales the overall rate of address mapping requests. For TTL/I, we partition the gateways into I groups, and estimate the client request rate for each group. The TTL for each group is set inversely proportion to its request rate.

FIG. 11 depicts an example of the scheduler logic for the probabilistic case. As depicted, in step 1105, P is incremented and modulo by the number of server (M). In step 1110, the state of server is tested for overloading. If W(P) is not equal to zero, in step 1115 a random number r, which is uniformly distributed between 0 and 1, is generated. In step 1112, if r is less than or equal to C(P), server P is assigned as the server node in block 1125. Otherwise, step 1105 is repeated to generate another candidate server.

FIG. 12 depicts an example of the TTL interval computation of step 1240. As depicted, in step 1240, TTL is the service requests rate from source A(I), adjusted by a scaling factor.

Alternatively, the TTL value can be set to proportional to C(I) to handle server heterogeneity and use a multi-tier round robin type of scheduling algorithm to handle the skewed client request rate.

Finally, feedback from the servers can be provided to the DNS scheduler to avoid overloading. For example, if a node becomes overloaded, an alarm can be generated to the DNS, so that fewer or no new clients are mapped to the overloaded node. When the load returns to normal, a recovery to normal message can be sent to the DNS. In the preferred embodiment, after a node sends in an alarm signal, it will no longer be considered by the DNS scheduler to receive new requests until its load returns to normal.

Now that a preferred embodiment of the present invention has been described, with alternatives, various modifications and improvements will occur to those of skill in the art. Thus, the detailed description should be understood as an example and not as a limitation. The proper scope of the invention is properly defined by the appended claims.

what is claimed is:

1. In a distributed or clustered network of servers wherein clients are divided into groups which periodically send mapping requests to an arbitrator for mapping and balancing service requests among multiple replicated servers which can service the request, a computerized method for mapping servers to service requests, said method comprising the steps of:

mapping a first mapping request from a first group to a first server according to a schedule;

dynamically computing a valid interval for said mapping request to the first server as a function of one of a first group request load and a first server capacity; and communicating the server selection and the valid interval to the first group for caching such that subsequent requests from the first group are routed to the first server during the valid interval.

2. The method of claim 1, wherein each of the servers are web servers at geographically distributed sites, the arbiter is an extended domain name server and each address mapping includes a time-to-live (TTL), and wherein the group consists of a set of clients associated with one of a common gateway and SOCKS server, said method comprising the steps of:

said mapping step comprises mapping a name request to an IP address; and said step of dynamically computing a valid interval comprises dynamically computing the TTL as a function of one of a gateway request load and a capacity of a destination server associated with the IP address.

3. The method of claim 1, wherein said mapping step comprises the step of mapping according to one of a round robin and multi-tier round robin schedule; and wherein the valid interval is inversely proportional to the request load and proportional to the server capacity.

4. The method of claim 1, wherein said mapping step comprises the step of mapping according to one of a probabilistic round robin and probabilistic multi-tier round robin schedule as a function of the server capacity; and wherein the valid interval is inversely proportional to the request load.

5. The method of claim 1, wherein said step of dynamically computing a valid interval for said mapping request to the first server comprises the steps of:

estimating the request load, including one of a hidden or explicit load associated therewith, and directed to the first server; and setting the valid interval as function of the request load associated with the group, in response to said estimating step.

6. The method of claim 5, wherein said step of setting the valid interval as function of the request load comprises the step of setting the valid interval as inversely proportional to the request load associated with the group.

7. The method of claim 1, wherein said step of dynamically computing a valid interval for said mapping request to the first server comprises the steps of:

estimating the first server capacity; and setting the valid interval as a function of the capacity of the selected server.

8. The method of claim 7, wherein the valid interval is directly proportional to the server capacity.

9. The method of claim 5, wherein said step of dynamically computing a valid interval for said mapping request to the first server comprises the steps of:

estimating the first server capacity; and setting the valid interval as function of both a first server capacity estimate and a request load estimate associated with the group.

10. The method of claim 9, wherein the valid interval is inversely proportional to the estimated load associated with the source group and proportional to the server capacity.

11. In a distributed or clustered network of servers wherein clients are divided into groups which periodically send mapping requests to an arbitrator for mapping and balancing service requests among multiple replicated servers which can service the request, said arbitrator comprising:

computer executable scheduling logic means for mapping a first mapping request form a first group to a first server according to a schedule;

computer executable dynamic valid interval means, coupled to said scheduling logic means, for dynamically computing a valid interval for said mapping request to the first server as a function of one of a first group request load and a first server capacity; and means for communicating both a first server identifier in response to said scheduling logic means and the valid interval, to the first group such that subsequent requests from the first group are routed to the first server during the valid interval.

12. The apparatus of claim 11, wherein each of the servers are web servers at geographically distributed sites, the arbitrator is an extended domain name server and each address mapping includes a time-to-live (TTL), and wherein the group consists of a set of clients associated with one of a common gateway and SOCKS server, said apparatus comprising:

said computer executable scheduling logic means comprises means for mapping a name request to an IP address; and said computer executable dynamic valid interval means comprises means for dynamically computing the TTL as a function of one of a gateway request load and a capacity of a destination server associated with the IP address.

13. The apparatus of claim 11, wherein said computer executable scheduling logic means comprises means for mapping according to one of a round robin and multi-tier round robin schedule; and wherein the valid interval is inversely proportional to the request load and proportional to the server capacity.

14. The apparatus of claim 11, wherein said computer executable scheduling logic means comprises means for mapping according to one of a probabilistic round robin and probabilistic multi-tier round robin schedule as a function of the server capacity; and the valid interval is inversely proportional to the request load.

15. The apparatus of claim 11, wherein said computer executable dynamic valid interval means comprises:

means for estimating the request load, including one of a hidden or explicit load associated therewith, and directed to the first server; and means for setting the valid interval as function of the request load associated with the group, in response to said estimating step.

16. The apparatus of claim 15, wherein said means for setting the valid interval as function of the request load comprises means for setting the valid interval as inversely proportional to the request load associated with the group.

17. The apparatus of claim 11, wherein said computer executable dynamic valid interval means comprises:

means for estimating the first server capacity; and means for setting the valid interval as a function of the capacity of the selected server.

18. The apparatus of claim 17, wherein the valid interval is directly proportional to the server capacity.

19. The apparatus of claim 15, wherein said computer executable dynamic valid interval means comprises:

means for estimating the first server capacity; and means for setting the valid interval as function of both a first server capacity estimate and a request load estimate associated with the group.

20. The apparatus of claim 19, wherein the valid interval is inversely proportional to the estimated load associated with the source group and proportional to the server capacity.

* * * * *